United States Patent [19]

Guile et al.

[11] B   4,006,029

[45]   Feb. 1, 1977

[54] HYDRATION RESISTANT FUSED DOLOMITIC GRAIN AND PRODUCTION METHOD THEREFOR

[75] Inventors: Donald L. Guile, Horseheads; Robert K. Smith, Corning, both of N.Y.

[73] Assignee: Corning Glass Works, Corning, N.Y.

[22] Filed: June 17, 1974

[21] Appl. No.: 480,287

[44] Published under the second Trial Voluntary Protest Program on March 30, 1976 as document No. B 480,287.

[52] U.S. Cl. ................................. 106/58; 106/63; 264/5; 264/12; 264/13

[51] Int. Cl.$^2$ ................. C04B 35/04; C04B 35/62

[58] Field of Search ............ 106/58, 63; 264/5, 12, 264/13

[56] References Cited

UNITED STATES PATENTS 3,262,795   7/1966   Davies et al. ........................ 106/58
3,332,740   7/1967   Alper et al. ........................ 106/58

Primary Examiner—J. Poer
Attorney, Agent, or Firm—Richard N. Wardell; Clarence R. Patty, Jr.

[57]   ABSTRACT

A basic fused refractory material consisting essentially of, by weight on the oxide basis, 50–67% MgO, 33–50% CaO, and preferably at least 98% MgO + CaO. The method of producing the fused refractory material by melting and solidifying a batch of refractory raw materials, wherein the cooling rate inducing solidification throughout the fused melt is at least 600 Centigrade degrees per hour and sufficient to yield the fused refractory product characterized by a fine microstructure retaining at least 2.0% MgO in solid solution in the lime phase and increased hydration resistance of the fused refractory material.

20 Claims, 1 Drawing Figure

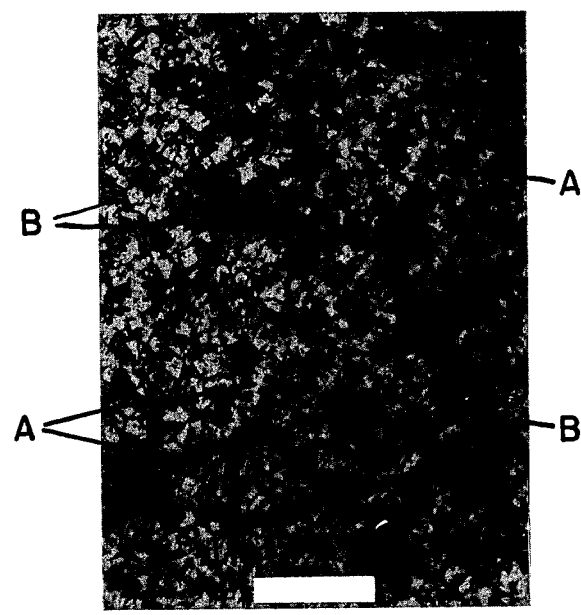

HYDRATION RESISTANT FUSED DOLOMITIC GRAIN AND PRODUCTION METHOD THEREFOR

FIELD OF THE INVENTION

The invention pertains to improvements in chemically basic refractory material of the dolomite type having, as its chief constituents, CaO and MgO, preferably totaling at least 98 percent by weight. Refractory material of this general nature is recognized as suitable for forming the inside working linings of basic oxygen steelmaking furnaces or vessels where such linings must withstand the severe corrosive effects of the chemically basic molten slags, slag vapors and other molten steelmaking ingredients. More specifically, the invention is concerned with completely melted and solidified mixtures of appropriate raw materials, principally dolomite (or the equivalent combination of lime and magnesia) with or without additions of magnesia or lime, to yield a CaO-MgO base fused product or material, either as a fused cast monolithic article or as fused grain that can be bonded to form bricks or other structural bodies.

DESCRIPTION OF THE PRIOR ART

Replacement of magnesite refractories by dolomitic refractories has been suggested in the steel industry as a method of cost saving. However, the replacement is not without its problems, as the lime in dolomite tends toward rapid hydration forming calcium hydroxide with an incident volume expansion. This hydration, which considerably weakens the refractory, has driven experimenters to explore various techniques for protecting the dolomitic material from hydration.

Recently, fusion casting has been the chief target of experimentation, although fusion casting of dolomitic material is not new. In fact, as early as 1881, Jacob Reese proposed (in U.S. Pat. No. 249,548) the melting and resolidifying of dolomite into fused cast bodies for lining steelmaking or other metallurgical vessels. Improvements in melting and casting were suggested by Sullivan in U.S. Pat. No. 2,113,818, relating to $SiO_2$ additions; and improvements in resistance to hydration, spalling and slag corrosion were suggested by McMullen in U.S. Pat. No. 2,310,591, relating to alumina or iron oxide additions to the dolomitic melt. More recently Alper, et al (U.S. Pat. No. 3,540,899) disclose compositional variations of the dolomite batch (including fluorine yielding additions) which effect greater hydration and thermal shock resistance. Davies, in U.S. Pat. No. 3,262,795, teaches the use of high purity raw material and controlled accessory oxide impurities in a CaO-MgO batch to greatly improve resistance of the fused cast refractory to slag corrosion.

The last mentioned U.S. Patent discloses a basic refractory having 50–95% MgO, 5–50% CaO, and at least 96% MgO + CaO the remainder being $SiO_2$, $Al_2O_3$ and $Fe_2O_3$. The greatly improved resistance to basic slags is disclosed as partly resulting from a massive macrocrystalline structure of the fusion casting (implying a slowly cooled casting).

SUMMARY OF THE INVENTION

Contrary to noted prior art, we have discovered that an extremely fine microstructure in fusion cast dolomitic refractory material resulting from a rapid soldification of the fused melt produces, without compositional additives, an hydration resistant fused refractory material. The rapid cooling produces a fused refractory material having at least 2.0% MgO (preferably about 2.3 – 7.5 percent) in solid solution in the lime phase which we believe is a contributing factor in the improved hydration resistance of the material. Cooling rates of the melt material of about 600 Centigrade degrees per hour have been found in our tests to be sufficient to retain the required 2.0 percent MgO in solid solution in the CaO phase. Preferred cooling rates of about 2000–14,400 Centigrade degrees per hour result in 2.3–7.5% MgO retained in solid solution.

The techniques of quick cooling are applicable to monolithic refractory shapes and to fused grain for bonding into brick. Since the hydration of dolomitic refractories appears to us to be a surface phenomenon, the monolithic fused articles need only have a quick chilled outside surface layer surrounding the material with at least 2.0 percent retained MgO in solid solution in the CaO phase therein. For example, a surface layer 1/100 of an inch thick surrounding a fused grain and having greater than 2.0% MgO in the lime solid solution therein, can be expected to protect the interior of the grain from hydration. Of course, the resistance is improved by a thicker layer having higher percentage of MgO in the solid solution. In any event, the center of any monolithic article or grain would not have to cool quickly according to the limits of the invention to be protected from hydration as long as the surface exposed to the atmosphere conforms to the limits. A fusion cast block, on the other hand, which is crushed or otherwise comminuted to form fused grain (for example, for rebonding into brick or for making ram mix), would have to be quickly solidified throughout its entirety according to the limits of the invention. Were it not completely solidified according to the invention, the surfaces exposed during comminution which lacked at least 2.0% MgO in CaO solid solution would hydrate when exposed to the atmosphere.

The present method invention of making hydration resistant fused refractory material may be used to produce refractories consisting essentially of, by weight on the oxide basis, 50–67% MgO, 33–50% CaO, and preferably at least 98% CaO + MgO. Suitable raw materials are selected from raw, calcined, or deadburned dolomite or compounds of lime and magnesia including mixtures thereof, which materials satisfy the critical chemistry. On a cost basis, dolomite is preferred over combinations of lime and magnesia. Other compositional variations suggested by the prior art which also aid in maximizing properties of the dolomitic fused material may also be used in conjunction with the present method of producing fusion cast basic dolomitic material to further increase desirable properties.

Preferred methods of quickly cooling the refractory to form fused grain include the blown bead process, the chilled roller process, and the chilled slab process. The blown bead process comprises dispersing a stream of the refractory melt into droplets and propelling the droplets through the air until solidified or until they strike a cooling surface where they are solidified. An air stream is typically used to disperse the melt and propel the droplets. Blowing of refractory melts is discussed in U.S. Pat. Nos. 1,871,793 and 2,136,096.

The chilled roller process involves merely feeding the refractory melt between two cooled rollers to produce a sheet of solidified melt, the rollers being spaced apart such that the entire sheet volume is quickly cooled according to the limits of the invention as it passes through the rollers. The solidified sheet is subsequently crushed and optionally sized to form fused grain. Spacing of the rollers is envisioned to be approximately 1 inch, but of course depends on the melt temperature and the roller size, speed of rotation and roller temperature, among other factors.

The chilled slab process is similar to the chilled roller process and comprises dripping or pouring the refractory melt onto a stationary chilled slab (for example a graphite slab) or, in production, onto a moving conveyor which is cooled. After solidifying, the fusion may be crushed and sized for rebonding.

The FIGURE is an 80X micrograph of a fused dolomitic material of the present invention. The white bar thereon indicates 0.01 inches in length. The primary crystals of MgO (labeled A) are embedded in the eutectic matrix of MgO and CaO (labeled B). The MgO in the matrix phase shows up as the light bands and the CaO as the dark bands. The particular material photgraphed was made from a batch of 69.5 percent dolomite, 30% MgO and 0.5 percent fluorspar.

We have found that the hydration resistance of the fused material is directly related to the amount of MgO in solid solution with the lime, which in turn appears linearly related to the rate of cooling of the melt through the solidification temperature range (as will be numerically shown in the Examples). The theoretical limit of MgO in solid solution with CaO is about 17 percent (according to a recent phase diagram, FIG. 229 in Phase Diagrams for Ceramists, American Ceramic Society, 1964). We have not retained 17% MgO by quick cooling; however, we believe that the hydration resistance would continue to improve right up to the theoretical limit. We have found that rates of cooling on the order of 14,400 Centigrade degrees per hour are sufficient to retain an average of at least 7.5% MgO in solid solution with the CaO and that this retention effects suitable hydration resistance to the fused material. Cooling rates of about 600 Centigrade degrees per hour result in average retentions of about 2.0% MgO in CaO solid solution which is the lower limit for any real benefit in hydration resistance of the refractory. A preferred lower limit for the MgO in the CaO solid solution is about 2.3 percent resulting from a cooling rate of about 2000°C/ hour.

Our new fused refractory material can be made by quickly chilling a melt of suitable composition using any convenient procedure including melting the premixed batch charge in an electric arc furnace and either casting the molten material into suitable preformed molds, onto cooling slabs (for example graphite slabs), or through cooling rollers, or by directly forming the molten material into grain (for example by the blown bead process). Batch materials providing compositions for this invention (principally deadburned dolomite or combinations of lime and magnesite) involve relatively moderate melting temperatures for basic refractory material (e.g. 2300°–2450°C) which allows the material to be rather easily melted and readily poured or formed into grain.

DESCRIPTION OF THE PREFERRED EMBODIMENTS

Example 1

In order to determine the effect of cooling rate on the retention of MgO in CaO solid solution in the fused cast body, some special V-shape castings were made in graphite molds. The wedge-shaped mold was 12 inches long with the thickness varying along the length from 0.16 centimeters on one end to 2.54 centimeters on the other end. The fused melt was poured into the mold and cooling rates along the length (being a function of the thickness of the casting) were visually estimated based on the time to cool below "red heat." The melt was made from a intimately blended batch of 70 percent dolomite - 30 percent magnesite analyzing on the oxide basis, 57.79% MgO, 40.39% CaO, 0.64% $SiO_2$, 0.35% $Al_2O_3$ and 0.13% $Fe_2O_3$ and was melted in an electric arc furnace at 2400°C. The cooling rate versus the percent of MgO retained in CaO solid solution, each averaged across the casting thickness at each end, are shown in Table I. Results for a 6 inch thick fused cast billet are also shown for comparison. The billet was cooled in an insulated graphite mold at almost a uniform rate (except very near the exposed surface). The sample, however, was taken from and the cooling rate estimated for approximately the center of the billet.

TABLE I

| Thickness of Casting (Centimeters) | Average Cooling Rate (°C/hr) | Average % MgO in CaO |
|---|---|---|
| 15.24 (billet) | 100 | 1.5 |
| 2.54 ("V" casting) | 2,400 | 2.5 |
| 0.16 ("V" casting) | 14,400 | 7.5 |

The hydration resistance was studied, as a function of the % MgO retained, by crushing the V casting into −28+35 Tyler mesh particles and identifying the position in the casting from which the particles were taken and the % MgO in CaO solid solution for that position. The particles were then subjected to 105°F temperature at 100 percent relative humidity for 44 days with the water weight gain shown in Table II.

TABLE II

| % MgO in CaO Solid Solution | % Wt. Gain |
|---|---|
| 7.5 | 1.13 |
| 5.0 | 1.54 |
| 4.2 | 2.40 |
| 3.7 | 3.00 |

Example 2

Several blown beads were produced from the melt of Example 1 by interrupting a stream of the melt with a blast of air from a nozzle located directly beneath the pouring spout of the melting furnace and approximately perpendicular to the melt stream. The blown melt droplets were quenched very rapidly as a result of the cooling effect of the blown air and the ambient temperature atmosphere on the small surface area of the blown droplet as it remained airborne. Hydration tests and x-ray analysis to determine the average % MgO retained in CaO solid solution in a bead for various sized beads were made as in Example 1. The water weight gain reported for the smallest bead is obviously much less than that of the crushed castings of Example 1 because of the protective surface of the beads.

TABLE III

MgO Retention in The Lime Phase of Spherical Blown Beads

| Thickness (Ave. Diameter, cm) | Average % MgO Retained | % Weight Gain 44 days |
|---|---|---|
| 0.4 | 3.2 | — |
| 0.04 | 7.0 | — |
| 0.03 | 7.5 | 0.10 |

Example 3

To test the theory regarding the role of increased MgO retained in CaO solid solution as affecting hydration resistance of the CaO, a group of beads from Example 3 were heated to 1600°C to exsolve the Mgo from the solid solution. After doing so, the control beads, having an average diameter of 0.03 cm and 7.5 percent retained MgO, averaged 0.10 percent weight gain in a 498 hour hydration test at 105°F and 100 percent relative humidity. The 0.03 cm average diameter heat-treated beads, without MgO in solid solution, increased in weight by 0.60 percent, a five-fold increase over the control beads. The heat-treated beads were also visably inferior as most had developed a powdery surface and had cracked.

It should be noted that while our data appears to substantiate our theory relating the % MgO in solid solution and the hydration resistance of the fused material, other theories are also available. For example, it is also a fact that the crystalline phases of the quickly chilled fusions are very fine indeed, so that even at moderate (for example, 59 percent) MgO levels in the raw batch, the MgO phase in the fusion casting actually approaches being continuous (note the FIGURE), which would account for the protection of the finely interdispersed CaO phase against hydration. Therefore, though we have found that the % MgO in solid solution is definitively related to and is an indication of the relative hydration resistance of the fused material, we are not at this time able to say that this is a causal relationship or the causal relationship for the quickly chilled fused material. Having discovered, however, a method of producing a hydration resistant fusion cast dolomitic material and having characterized the material obtained in the process,

We claim:

1. A basic, fused refractory material consisting essentially of, by weight on the oxide basis, 50–67% MgO and 33–50% CaO, and being characterized in at least a surface layer thereof by a fine microcrystalline structure having at least 2.0% MgO in solid solution in the CaO phase.

2. The fused refractory material of claim 1 wherein the microcrystalline structure has 2.0%–17% MgO in solid solution in the CaO phase.

3. The fused refractory material of claim 1 wherein the microcrystalline structure has about 2.3–7.5% MgO in solid solution in the CaO phase.

4. The fused refractory material of claim 3 consisting of at least 98% MgO plus CaO, by weight.

5. A basic, fused refractory material consisting essentially of, by weight on the oxide basis, 50–67% MgO and 33–50% CaO, and being characterized throughout the material by a fine microcrystalline structure having at least 2.0% MgO in solid solution in the CaO phase.

6. The fused refractory material of claim 5 wherein the microcrystalline structure has about 2.3–7.5% MgO in solid solution in the CaO phase.

7. The fused refractory material of claim 6 consisting of at least 98% MgO plus CaO by weight.

8. An improved method of producing a basic fused refractory material consisting essentially of, by weight on the oxide basis, 50–67% MgO and 33–50% CaO, by a process of melting and solidifying a refractory raw material wherein the improvement comprises cooling the melt to induce solidification at a rate sufficient to retain at least 2.0% MgO in solid solution with the CaO phase in at least a surface layer surrounding the fused refractory material.

9. The method of claim 8 wherein the cooling rate is sufficient to retain about 2.3–7.5% MgO in solid solution in the CaO phase.

10. The method of claim 9 wherein the cooling rate at the surface of the fused material is between about 2000 and 14,400 Centigrade degrees per hour.

11. The method of producing fused refractory material according to claim 8 wherein cooling of the melt is initiated by dispersion of the melt into droplets by means of a gas stream.

12. The method of claim 11 wherein the cooling rate at the droplet surface is sufficient to retain 2.0–17.0% MgO in solid solution in the CaO phase.

13. The method of claim 12 wherein the cooling rate at the droplet surface is sufficient to retain about 2.3–7.5% MgO in solid solution in the CaO phase.

14. An improved method of producing a basic, fused refractory material consisting essentially of, by weight on the oxide basis, 50–67% MgO and 33–50% CaO, by a process of melting and solidifying a refractory raw material wherein the improvement comprises cooling the melt to induce solidification at a rate sufficient to retain at least 2% MgO in solid solution with the CaO phase throughout the fused refractory material.

15. The method of producing fused refractory material according to claim 14 wherein the melted refractory batch is solidified on a chilled slab and is mechanically crushed after solidification.

16. The method of claim 15 wherein the cooling rate at any point in the melt is sufficient to retain about 2.3%–7.5% MgO in solid solution in the CaO phase.

17. The method of claim 16 wherein the cooling rate at any point in the melt is between about 2000 and 14,400 Centigrade degrees per hour.

18. The method of claim 14 wherein cooling of the melt is initiated by dispersion of the melt into droplets by means of a gas stream.

19. The method of claim 18 wherein the cooling rate throughout the droplet is sufficient to retain 2.0–17.0% MgO in solid solution in the CaO phase.

20. The method of claim 19 wherein the cooling rate is sufficient to retain about 2.3–7.5% MgO in solid solution in the CaO phase.

* * * * *